United States Patent Office 3,620,100
Patented Nov. 16, 1971

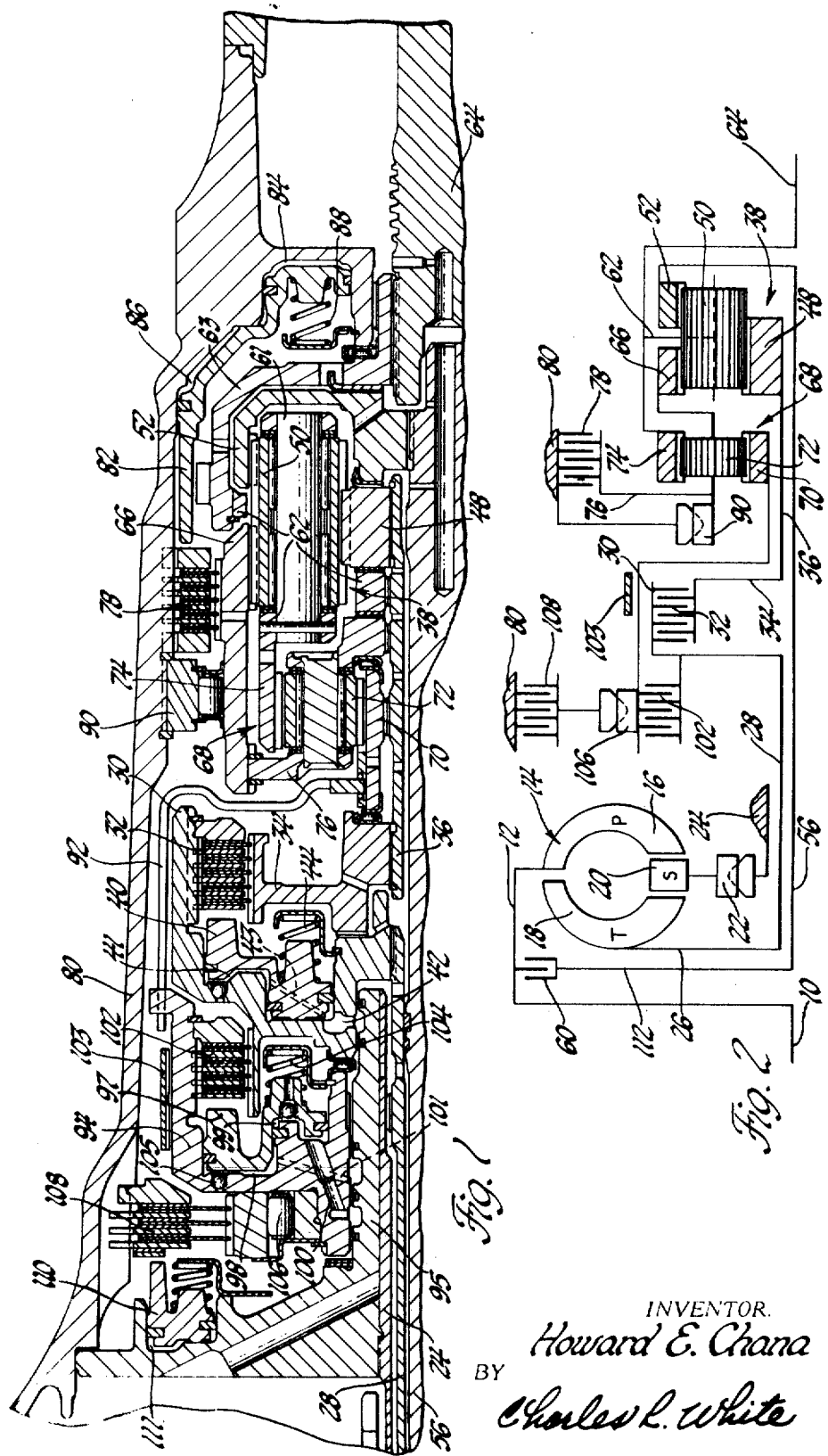

3,620,100
HIGH RATIO COVERAGE AUTOMATIC
TRANSMISSION
Howard E. Chana, Flint, Mich., assignor to General
Motors Corporation, Detroit, Mich.
Filed Nov. 28, 1969, Ser. No. 880,779
Int. Cl. F16h 47/08, 57/10
U.S. Cl. 74—688                                     9 Claims

ABSTRACT OF THE DISCLOSURE

Power transmission comprising a hydrodynamic torque converter operatively connected to first and second planetary gearsets connected to a plurality of friction drive establishing devices which are engageable to condition the gearsets for low, intermediate, high and overdrive. In the preferred embodiment for low speed ratio, the first gearset is conditioned to produce an underdrive by the automatic engagement of a one-way brake with a first sun gear being driven. Intermediate ratio is obtained by additionally conditioning a second one-way brake to hold a reaction gear in the second planetary gearset so that gearsets combine to increase output speed. In direct or 1:1 ratio the drive can be all converter, all mechanical or split torque. There is a front clutch engaged for the all mechanical and the split torque direct drives. Also, this clutch is engaged for a mechanical overdrive with the gearsets again combining.

---

This invention relates to power transmission and more particularly to a high ratio coverage automatic transmission in which simple planetary gearsets are combined to provide a plurality of forward drive gear ratios including overdrive and a reverse drive gear ratio.

Prior to the present invention there have been a number of proposals to increase the ratio coverage of automatic transmissions including proposals for an overdrive gear ratio for improved cruising efficiency. Generally, these transmissions have not been commercially acceptable because of the complex nature of their gearing and the large number of elements required to produce the desired drive ratios. In some of these transmissions, a front clutch has been employed for providing a mechanical power path to the gearing conditioned to produce an overdrive ratio. However, such constructions have not generally been employed because their added expense was greater than the operational savings.

In this invention economy of construction is achieved with first and second simple planetary gearsets and associated friction drive establishing devices combining to produce a wide range of gear ratios with converter multiplication in low and intermediate ranges. In low range a single gearset is automatically conditioned for this drive by engagement of one-way brake. In intermediate or second range a friction drive establishing device automatically engages to produce an intermediate range ratio with the gearsets combining to increase output speed. In this transmission a third range 1:1 drive can be all hydraulic through the converter, a mechanical drive with a locked up converter or a torque split through the converter with the latter two options effectively utilizing the front clutch. A fourth gear, preferably an overdrive for more efficient and economical cruising, is provided with engagement of the front clutch and a brake band. In this overdrive the gearsets again compound and are driven mechanically to produce the desired overdrive ratio.

These and other objects and improvements wil become more apparent from the detailed description and drawings in which:

FIG. 1 is a longitudinal view partly in section of the upper half of the gearing and associated drive establishing devices of the transmission of this invention.

FIG. 2 is a diagramatic view of the upper half of a transmission constructed in accordance with this invention.

As shown in FIG. 2 the transmission of the invention has an input 10 which is drivingly connected to the front cover of a housing 12 of a hydrodynamic torque converter 14. The torque converter has a plurality of rotors comprising: a bladed pump 16 operatively connected to housing 12, a bladed turbine 18 and a bladed stator 20. The stator is connected through a one-way brake 22 to a ground sleeve 24. The turbine is drivingly connected to the flange of a hub 26 which is splined to a sleeve shaft 28. Sleeve shaft 28 is splined to the inner hub of an annular drum 30 as best shown in FIG. 1. This drum houses the friction plates of a forward drive clutch 32 having drive plates splined to the interior wall of the drum and having driven plates, disposed between the drive plates, splined to the outer periphery of annular plate support hub 34. The support hub is splined to an intermediate sleeve shaft 36 which drives a first planetary gearset 38 described below.

An annular piston 40 is housed in drum 30 and cooperates therewith to form clutch apply chambers 41 and 42 connected by restricted passage 43. When working fluid under pressure is supplied to chamber 42, the piston will move axially to effect engagement of forward clutch 32. By virtue of the restriction 43 chamber 41 gradually fills with this fluid to increase clutch capacity. This dual capacity clutch construction provides for softer and better timed shifts particularly a 4–3 downshift. Spring 44 is a return spring supported in drum 30 for engaging and moving the piston from engagement with clutch 32 when the pressure in the apply chambers are exhausted.

The intermediate shaft 36 is splined to the sun gear 48 of the first planetary gearset 38. This gearset has elongated planet gears 50 which mesh with the sun gear 48 and also with an input ring gear 52 which has a rearwardly-extending hub portion splined to the end of a drive shaft 56. This drive shaft extends longitudinally in the transmission and is operatively connected to a front clutch 60 as shown in FIG. 2.

The planetary gearset 38 has a carrier 62 which fixedly supports pivot pins 61 on which planet gears 50 are rotatably mounted. The planetary carrier is rigidly secured to the interior of an output shell 63 which forms a connector splined to a rearwardly-extending output shaft 64. Also, this planetary gearset has a second ring gear 66 meshing with planet gears 50 which has a forwardly-extending portion that surrounds a second planetary gearset 68 disposed adjacent to the planetary gearset 38.

Planetary gearset 68 has a sun gear 70 which meshes with the planet gears 72 that in turn mesh with the ring gear 74. Ring gear 74 extends rearwardly and is connected to the carrier 62 of the first gearset while the carrier 76 of planet gears 72 of the second gearset is rigidly secured to the interior of the extension of ring gear 66.

A multi-plate low and reverse friction brake 78, disposed between ring gear 66 and the interior of transmission housing 80, is engageable by a hydraulically-operated piston 82 to connect the ring gear to the housing to establish low and reverse drive ratios as will be further explained below. This piston is movably mounted in the rear of the transmission housing and cooperates therewith to form separate pressure chambers 84 and 86 connected by separate passages and controls, not shown. For low speed drives, chamber 84 is supplied with pressurized working fluid to effect the movement of piston 82 and the engagement of brake 78. For reverse, higher reaction torques are needed and the torque capacity of brake 78 is increased by charging both chambers with working fluid. Return spring 88 mounted on housing 80 moves the piston to the off position when the apply chambers are exhausted.

ratio can be readily obtained. The schedule of engagement of the clutches and brakes to obtain these ratios is set forth in the following chart:

| Range | Friction elements | | | | | | | | Converter | Example ratio |
|---|---|---|---|---|---|---|---|---|---|---|
| | 60 | 102 | 32 | 108 | 78 | 103 | 106 | 90 | | |
| Neutral | | | | | | | | | | |
| Automatic drive: | | | | | | | | | | |
| 1 | | | On | | | | Lock | Lock | Open | 2.87/1 |
| 2 | | | On | On | | | do | OR | do | 1.64/1 |
| 3A | | On | On | On | | | OR | OR | do | 1/1 |
| 3B | On | On | On | On | | | OR | OR | Locked | 1/1 |
| 3C | On | | On | On | | | OR | OR | Split Torque | 1/1 |
| 4 | On | | | On | | On | | OR | Locked | .66/1 |
| Low | | | On | | On | | Lock | Lock | Open | 2.87/1 |
| Intermediate | | | On | On | | On | do | Or | do | 1.64/1 |
| Reverse | | On | | | On | | | | do | −1.94/1 |

Disposed adjacent to multi-plate brake 78 is a one-way brake 90 operatively connected to the outer periphery of ring gear 66 and the interior of the transmission housing. This brake automatically engages to prevent the reverse rotation of the ring gear 66 and the carrier 76 and automatically disengages to allow these elements to rotate forwardly.

The sun gear 70 of the second planetary gearset has a forwardly-extending sleeve portion concentric with sleeve shaft 36 and this sleeve portion is connected to a sheet metal drum 92 that extends forwardly around drum 30. As shown, drum 92 has extending tabs or projections which fit in special openings formed in an annular flange portion of a drum 94 which is rotatably mounted on an inner-extending portion 95 of the transmission housing. The drum houses a piston 97 which forms pressure chambers 98 and 99 within the drum 94 connected by separate passages 100 and 101 to the controls. Apply oil when fed by the controls to chamber 99 or both chambers 98 and 99, causes the piston to engage a multi-plate clutch 102. This clutch has driven plates splined to the interior of drum 94 and drive plates interleaved with the driven plates and splined to an annular shoulder extending forwardly from drum 30. The engagement of clutch 102 connects drums 94 and 30 together. Return spring 104 secured to drum 94 engages the piston 97 to move it to an off position when chambers 98 and 99 are exhausted. Conventional ball dump valves such as valve 105 are employed in this transmission. This valve opens when chamber 98 is open to exhaust and when the drum 94 is rotating to prevent residual centrifugal oil from effecting movement of piston 97 and engagement of clutch 102. There is an annular brake band 103 which is operated by a servo mechanism for selectively engaging drum 94 to hold it from rotation when establishing predetermined ratios as will be pointed out below.

Mounted on a forwardly-extending collar portion of drum 94 is the inner race of a one-way clutch 106. There is also a multi-plate friction brake 108 having a first series of plates splined to the other outer race of this one-way device and a second series of plates splined to the interior of housing 80. Piston 110 mounted on an interior shoulder of portion 95 of the transmission housing engages the brake 108 when the pressure chamber 111 formed by this piston and the housing is charged with apply pressure through a passage not shown. A suitable return spring supported on the transmission housing is employed to move piston 110 to an inactive or off position when the associated apply chamber is exhausted.

Turning again to FIG. 2, it will be seen that the drive shaft 56 extends axially in the transmission and has an annular clutch support 112 for the driven plates of front clutch 60 splined to its periphery forward end. Drive plates are splined to the interior of housing 12 and the clutch 60 is controlled by a hydraulically actuated motor mechanism not illustrated.

With the invention as shown and described a plurality of forward drive ratios, a neutral and a reverse drive When the transmission is set for automatic drive, first, second, third and fourth speed ratios are automatically selected in accordance with torque demand and vehicle speed signals. When torque requirements are high as when initially moving the vehicle, forward clutch 32 is applied. Turbine torque is transmitted by clutch 32 through sleeve shaft 36 to the sun gear 48 of the planetary gearset 38. Ring gear 66 will be held by the one-way brake 90 and the carrier 62 will be driven forwardly at low speed in the largest reduction ratios such as listed in the schedule. The one-way clutch 106 locks but this does not affect the drive since brake 108 is released at this time.

As vehicle speed increases and torque demand decreases the transmission upshifts into second gear. In this gear the intermediate brake 108 is applied in addition to forward clutch 32 as shown in the schedule. Under these conditions the outer race of one-way clutch 106 is grounded and this one-way device locks to hold sun gear 70 for reaction. With ring gear 74 rotating forwardly and with sun gear 70 held, the planets 72 will be driven forwardly. The output speed of ring gear 74 and connected output shaft 64 increase as the planet gears walk on the stationary sun gear 70 to produce an intermediate speed ratio. During this drive the one-way brake 90 overruns indicated by the letters OR in the chart. For a torque converter direct or third range drive, clutches 102 and 32 are applied as indicated by drive 3A. Under these conditions the sun gears 70 and 48 are connected and the planetary gearset is locked up for rotation as a unit in a ratio of 1:1. Friction brake 108 is on but has no effect on this operation since the one-way clutch 106 overruns.

If an all mechanical direct drive is desired the front clutch 60 is additionally engaged as indicated in drive 3B. With the gearset locked and driven mechanically through the clutch 60 there is no converter slippage and operating efficiency is improved. Fr a split torque direct drive indicated as drive 3C, the front clutch 60 and forward clutch 32 are applied. Under these conditions sun gear 48 will be driven by the converter and ring gear 52 will be driven mechanically to produce a torque ratio of 1:1. This drive will be approximately ⅔ mechanical and ⅓ hydraulic. The friction brake 108 is on but has no effect on this drive since the one-way clutch 106 overruns.

For overdrive, front clutch 60 and brake band 103 are engaged. With sun gear 70 held for reaction and ring gear 52 mechanically driven forwardly, an all mechanical overdrive is produced with the carrier 62 and output shaft rotating faster than input 10.

For low hold, forward clutch 32 and brake 78 are applied. With sun gear 48 driven forwardly by the converter and ring gear 66 held for reaction the carrier 62 and connected output shaft will be driven forwardly at the low speed ratio. Since brake 78 is engaged the ring gear 66 is held from rotation so that it cannot overrun the one-way brake 90 to prevent freewheeling under coast conditions for engine braking. As shown in the schedule one-way brake 90 is on to assist in holding the ring gear from reverse rotation.

For intermediate hold, forward clutch 32 is engaged to transmit converter torque to sun gear 48 and brake band 103 is engaged with drum 94 to hold sun gear 70 for reaction. Under these conditions the two carriers 62 and 76 compounds so that forward rotation of sun gear 48 results in forward-medium speed of the carrier 62 and the connected output shaft 64. The application of brake band 103 prevents freewheeling of the transmission under coast conditions. Brake 108 and one-way clutch 106 are on to assist in holding the sun gear 70 from reverse rotation.

For reverse, clutch 102 and brake 78 are engaged. Under these conditions with sun gear 70 driven forwardly and with carrier 76 held for reaction, the ring gear 74 and the connected output shaft are driven in a reverse direction at a reduced speed.

In neutral all clutches and bands are released and the gearset is stationary for any input speed.

To produce the gear ratios listed above, the gearset 38 had ring gears with 82 teeth, a sun gear with 46 teeth and planet gears with 20 teeth; gearset 68 has a ring gear with 74 teeth, a sun gear with 38 teeth and planet gears with 18 teeth. Other beneficial ratios can be readily produced by appropriately changing the teeth numbers of the gearing components.

This invention is not limited to the details of the construction shown and described for purposes of illustrating the invention for other modifications will occur to those skilled in the art.

What is claimed is:

1. A power transmission comprising an input and an output, a hydrodynamic unit having input rotor means driven by said input and having output rotor means, a gear unit comprising first and second operatively connected planetary gearsets, said first gearset having first and second input members, power transmitting means operatively connected to said output rotor means for driving said first input member, brake means operatively connected to said first gearset engageable to condition said first gearset for a speed reducing gear ratio when said first input member is driven, first selectively engageable clutch means operatively connected to said planetary gear unit and engageable to lock said gearsets together for rotation as a unit, second selectively engageable clutch means for operatively connecting said transmission input to said second input member so that said planetary gear unit will be mechanically driven at a 1:1 input/output ratio when said first clutch means is also engaged, and brake means to hold one of said gears of said second planetary gearset for reaction so that said gearsets will be mechanically driven by said input to provide an overdrive gear ratio.

2. In a transmission, an input and an output, a hydrodynamic unit having input rotor means driven by said input and having output rotor means, planetary gear means comprising first and second operatively connected planetary gearsets, power transmitting means including selectively engageable first clutch means for drivingly connecting said output rotor means to a first member of said first gearset, said gearsets having connected output members drivingly connected to said transmission output, brake means for holding one of the members of said first gearset for reaction to condition said first gearset for a low speed drive in response to the drive of said first member of said first gearset by said output rotor means, and selectively engageable means for holding a member of said second gearset for reaction so that the planetary gearsets combine to drive their output members and said connected transmission output at an intermediate speed ratio in response to the drive of said first member of said first gearset by said output rotor means.

3. A power transmission comprising an input member and an output member, a hydrodynamic torque converter having a pump driven by said input member and having a turbine, gear unit operatively connected to said pump and said output member, said gear unit comprising first and second simple planetary gearsets operatively connected to each other, each of said gearsets having planet gears meshing with a sun gear and a ring gear and having a carrier for said planet gears, said first gearset having an additional ring gear, friction drive establishing means operatively connected to said gear unit and engageable to condition said unit for a speed reducing ratio, power transmitting means operatively connected to said second ring gear, first selectively engageable clutch means for connecting said second ring gear to said input member, second power transmitting means operatively connected to the sun gear of said first gearset, second clutch means for connecting said second power transmitting means to said turbine to provide a split hydraulic and mechanical torque direct drive ratio when said first clutch means is also engaged, and third clutch means engageable for locking said planetary gearsets to provide an all hydraulic direct drive ratio when said second clutch is also engaged and an all mechanical direct drive ratio when said first clutch is engaged.

4. A power transmission comprising input means and output means, a hydrodynamic unit having input rotor means driven by said input means and having output rotor means, first and second simple planetary gearsets each having planet gears drivingly connecting a sun gear and a ring gear and each having a planetary gear carrier, said first planetary gearset having a second ring gear, means for connecting said ring gear of said second planetary gearset and said carrier of said first planetary gearset to each other and to said output means, means drivingly connecting said first ring gear of said first planetary gearset to said planetary gear carrier of said second planetary gearset, power transmission means for connecting said output rotor means to one of said gears of said first planetary gearset, first and second selectively engageable clutch means for locking said gearsets together for rotation as a unit to produce a direct drive ratio, power transmitting means operatively connected to said second ring gear, and third clutch means selectively engageable to drivingly connect said power transmission means to said second ring gear to provide a split torque direct drive when said first clutch means is also engaged and said second clutch means is disengaged.

5. In a power transmission, an input and an output, a hydrodynamic torque converter having input rotor means and output rotor means, a range gear unit operatively connecting said output rotor means to said transmission output comprising first and second gearsets, each of said gearsets having a sun gear and a ring gear operatively connected by planet gears and having a carrier, said first gearset having a second ring gear meshing with the associated planet gears, said carrier of said first gearset being drivingly connected to said ring gear of said second gearset and to said output, said carrier of said second gearset being drivingly connected to one of said ring gears of said first gearset and also to brake means engageable to hold said last-mentioned carrier and one of said ring gears of said first gearset for reaction, first clutch means for drivingly connecting said output rotor means with said sun gear of said first gearset for low range drive when said brake means is engaged, second clutch means engageable to connect said output rotor means to said sun gear of said second gearset for direct drive when said first clutch means is also engaged, brake means engageable to hold said sun gear of said second gearset for reaction, and third clutch means for drivingly connecting said input to said second ring gear to condition said planetary gearsets for overdrive when said last-mentioned brake means is engaged.

6. A power transmission comprising an input and an output, a hydrodynamic unit having input rotor means driven by said input and having output rotor means, first and second operatively connected simple planetary gearsets drivingly connected to said output, each of said gearsets having planet gears drivingly connecting a sun gear and a ring gear and having a carrier for said planet gears, a first of said gears of said first planetary gearset being an input gear, power transmitting means operatively connecting said rotor means to said input gear, a one-way brake means operatively connected to the carrier of said second planetary gearset and a second gear of said first planetary gearset, a one-way device operatively connected to a first of said gears of said second gearset, and drive establishing means operatively connected to said one-way device and disengageable to allow said one-way brake to engage and hold said second gear of said first gearset for reaction when said input gear is driven to condition said first planetary gearset for a low speed gear ratio and engageable to allow said one-way device to hold said first gear of said second gearset for reaction when said input gear is driven to condition said gearsets to combine and produce an intermediate speed gear ratio with said one-way brake overrunning.

7. The power transmission defined in claim 6 and further including ring gear means meshing with the planet gears of said first gearset to provide a second input, power transmitting means operatively connected to said ring gear means, and clutch means selectively engageable for operatively connecting said power transmitting means to said input to condition said transmission for split torque direct drive when said input gear is driven by said input rotor means.

8. The power transmission defined in claim 6 and further including ring gear means meshing with the planet gears of said first gearset to provide a second input, power transmitting means operatively connected to said ring gear means, and clutch means for operatively connecting said power transmitting means to said transmission input to condition said gear units for split torque drive when said first input gear is driven by said input rotor, brake means for holding said first gear of said second planetary gear unit for reaction to provide an all mechanical overdrive gear ratio when said clutch means is engaged and said transmission input is driving said ring gear means.

9. Power transmission of claim 6 wherein said ring gear of said first planetary gearset is operatively connected to said carrier of said second planetary gearset and wherein said ring gear of said second planetary gearset is operatively connected to said carrier of said first planetary gearset, connector means connecting said carrier of said second planetary gearset to said transmission output, and said one-way brake being operatively connected to the carrier of said second planetary gearset to prevent rotation in a rearward direction as compared to the rotation of said transmission input rotor means and selectively engageable clutch means operatively disposed in said power transmission engageable to effect a low speed input/output ratio in response to engagement of said one-way brake.

References Cited

UNITED STATES PATENTS

| 2,874,590 | 2/1959 | Kelbel | 74—688 |
| 2,893,265 | 7/1959 | Burtnett | 74—688 X |
| 3,106,107 | 10/1963 | Hardy | 74—688 |

ARTHUR T. McKEON, Primary Examiner

U.S. Cl. X.R.

74—759